United States Patent [19]
Dockser

[11] Patent Number: 5,764,357
[45] Date of Patent: Jun. 9, 1998

[54] ZERO-RUN-LENGTH ENCODER WITH SHIFT REGISTER

[75] Inventor: Kenneth A. Dockser, San Jose, Calif.

[73] Assignee: VLSI Technology, Inc., San Jose, Calif.

[21] Appl. No.: 631,264

[22] Filed: Apr. 12, 1996

[51] Int. Cl.$^6$ .............................. H04N 1/419; H04N 1/41
[52] U.S. Cl. ........................ 358/261.1; 358/261.4; 358/426; 358/539; 382/232; 382/245; 382/246; 341/67
[58] Field of Search ..................... 358/261.1, 427, 358/261.4, 426, 431, 530, 539; 382/232, 234, 245, 246; 341/59, 63, 65, 67

[56] References Cited

U.S. PATENT DOCUMENTS

| | | | |
|---|---|---|---|
| 5,079,548 | 1/1992 | Fujiyama et al. | 341/67 |
| 5,291,282 | 3/1994 | Nakagawa | 348/384 |
| 5,325,092 | 6/1994 | Allen | 341/65 |
| 5,327,254 | 7/1994 | Daher | 358/426 |
| 5,339,164 | 8/1994 | Lim | 358/261 |
| 5,341,318 | 8/1994 | Balkanski et al. | 364/725 |
| 5,367,299 | 11/1994 | Calamera | 341/67 |
| 5,436,626 | 7/1995 | Fujiwara et al. | 341/67 |
| 5,642,115 | 6/1997 | Chen | 341/67 |
| 5,694,127 | 12/1997 | Tayama | 341/67 |

*Primary Examiner*—Thomas D. Lee
*Attorney, Agent, or Firm*—Clifton L. Anderson

[57] ABSTRACT

A zero-run-length encoder for a JPEG compression system comprises an addressable memory for storing 63 input values (quantized AC DCT coefficients), zero-detection logic, a shift register, a value generator, an accumulator, a Huffman encoder, done-detection logic, and last-value-detection logic. For each input value, the zero-detection logic stores zero/nonzero indications in a respective bit position of the shift register. The value generator includes a leading-zero counter that determines the number of leading zeroes in the leading fifteen bit positions of the shift register. This count is used to determine an offset value which is added to a previous address value (initially zero) to yield a present address value. The present address value is used to select a memory location from which an input value is read from memory into the Huffman encoder. The Huffman encoder generates an output code as a function of the addressed input value and the leading zero count. The leading zero count is also used as a basis for the amount the contents of the shift register are shifted to begin the next code cycle. The done-detection logic determines when the shift register contains only zeroes; in that case, the input cycle ends, the accumulator is reset to zero and a new set of input values can be accepted. In addition, the done indication results in an EOB ("end of block") code being generated unless the last-value-detection logic indicates that the present address corresponds to the last (highest order term) input value. The action of the shift register allows the zero-run-length encoder to skip cycles in which zero input values would be processed. Thus, simple, high performance hardware zero-run-length encoding is achieved.

4 Claims, 2 Drawing Sheets

ZERO-RUN-LENGTH ENCODER WITH SHIFT REGISTER

BACKGROUND OF THE INVENTION

The present invention relates to data processing and, more particularly, to a system for compressing image data. A major objective is to provide for relatively fast and effective image data compression.

Just as it may be "worth a thousand words", a picture may also "cost" a thousand words or more in terms of communications bandwidth. Digital representations of individual full-color pictures can require on the order of a million data words of storage. The explosive growth of the Internet and the World Wide Web have fueled a demand for the transfer of color still and video images. Unfortunately, most connections to the Internet are through analog modems which can require tens of minutes to transfer a single color image. As faster data communications hardware is developed and made affordable, bandwidth increases. However, the demand for communications bandwidth, e.g., to handle multiple channels of interactive video, continues to outpace the available hardware.

As long as available communications bandwidth does not meet the demand for image data transfer, there is a need to minimize the amount of data required to represent images. There are many compression schemes for reducing the amount of data to represent an image. Compression is, in effect, a type of encoding. Where the compressed data is transmitted, the receiver must have a compatible decoder to decompress the image data before it can be viewed or manipulated.

Where the data is to be available for general distribution (e.g., over the Internet), it is highly desirable for the compression scheme to be standardized to maximize the likelihood that the recipient has the appropriate means to decompress the data. A "Joint Photographic Experts Group", working under the auspices of major international standards organizations, has developed an international standard compression scheme for still color images. This compression scheme is referred to as JPEG, an acronym for the group that developed it. A related compression scheme for video is referred to as "MPEG", an acronym for the "Motion Picture Experts Group" that developed it. MPEG takes advantage of correlations between successive video frames to achieve higher compression ratios than JPEG typically attains. This application deals primarily with JPEG, but applies as well to MPEG and similar compression schemes.

As described in detail in JPEG *Still Image Data Compression Standard* by William B. Pennebaker and Joan L. Mitchell, Van Nostrand Reinhold, New York, 1993, JPEG is a standard for compressing digital images. Print or other analog images are scanned or otherwise sampled to yield digital images prior to compression. These digital images comprise a two-dimensional array of picture elements (pixels), with a color being assigned to each pixel. Each color is expressed as a point in a three-dimensional color space, e.g., RGB, CMY, HSV, YUV, YIQ, YCrCb, CIELUV, CIELAB. Of these, RGB (red-green-blue) is perhaps most familiar as the additive color scheme used for television and computer displays. While JPEG compression can be applied to any of these color spaces, its effectiveness varies among the color spaces. In many cases, a color space coordinate transform is applied to express a digital image originally in one color space, e.g., RGB, in a second color space, e.g., CIELAB, that is better suited for compression.

JPEG compression can be applied to images expressed in any of these three-dimensional color spaces to reduce the amount of data required to characterize the image. The JPEG standard is flexible in allowing a tradeoff between the degree of compression and the fidelity achieved after decompression. Lossless JPEG permits the original digital image to be perfectly restored upon decompression. Lossy JPEG permits the original digital image to be restored with varying degrees of fidelity. Herein, the focus is on lossy JPEG compression since it generally achieves much greater compression with acceptable losses in image fidelity.

To the extent that colors deviate from the original, it is desirable that they deviate toward a neutral rather than an extreme color. As explained in greater detail below, greater compression is achieved by forcing small numeric values to zero. This in effect, moves colors toward the origin (the point at which all coordinate values are zero) of a color space. The origins of all but one of the listed color spaces represent black; the origin of CMY space is white. In JPEG, 128 is subtracted from all 8-bit values to translate the numeric range 0–255 to the range −128–+127, and 2048 is subtracted from all 12-bit values to translate the numeric range 0–4095 to −2048–+2047. This in effect, translates the origin of any of the listed spaces from an extreme color (black or white) to a neutral medium gray.

In lossy JPEG compression, images larger than 8×8 pixels, as are most images, are divided into 8×8 blocks, that are processed independently. For each block, each of the three color dimensions is treated separately and expressed as an 8×8 array of signed (negative or positive) 8- or 12-bit values. A discrete cosine transform (DCT) converts this 8×8 array of values into an 8×8 array of coefficients. These coefficients, when used to weight respective terms of an 8×8 array of basis functions allow the original pixel block to be reconstructed. Each basis function is itself an 8×8 pixel intensity pattern. As a group, the sixty-four basis functions are chosen to be orthogonal so that they can be varied independently.

One of the basis functions is a solid white (or black in the case of CMY) block; its coefficient corresponds to the average of the pixel values of the original pixel block. The product of this basis function and its coefficient is referred to as the "DC" term, by analogy with "direct current" or "DC" as applied to constant magnitude electrical currents; likewise, the coefficient in the DC term is referred to as the "DC coefficient". The remaining sixty-three basis functions vary in a spatially periodic manner along one or both dimensions. The corresponding terms and coefficients are referred to as "AC", by analogy with "AC" or "alternating" electrical current. JPEG treates the AC and DC terms separately. Herein, the focus is on the AC terms.

The degree of compression to be achieved is tied in large part to the number of coefficients that, after rounding, equal zero. The number of coefficients equal to zero can be increased by dividing the coefficients by respective scaling factors greater than unity and then rounding (in other words, "quantizing") to the nearest integer. If the scaling factors correspond to the visibility thresholds of the underlying basis functions, multiplying by the respective scaling factors during decompression should result in an image that is not perceptibly different from the original. At the expense of some visible artifacts in the reconstructed image, larger scaling factors can be used to attain (after rounding) a larger number of zeroes and, therefore, greater compression.

The procedure to this point is designed to put the image data into a form that can be effectively compressed. The next stage of the procedure is to apply entropy encoding to compress the data. In this encoding, Huffman codes are assigned to all possible combinations of runs (up to some limit) of zeroes and the next non-zero magnitude. A specific Huffman code is also assigned to runs of zeroes attaining a predetermined length (e.g., 16 zeroes); longer runs of zeroes are treated as including one or more blocks of zero runs.

In general, the amount of data (number of bits) required to represent the Huffman encoded image is much less than the number of bits required to represent the original image. The Huffman encoded data is combined with other Huffman coded data corresponding to the other dimensions and pixel blocks, DC terms, etc., of the original image, for efficient transmission.

Upon reception, the data is decompressed. The AC coefficients of the transmission are Huffman decoded, scaled up, subjected to an inverse DCT to reconstruct pixel data. The resulting image is a more or less faithful reproduction of the original image.

It is apparent from the foregoing, that JPEG compression is a computationally intensive process. Software implementations of JPEG compression can be unacceptably slow in processing large (>1,000,000 pixels) full-color images and also large numbers of smaller images (as in video compression). Hardware implementations afford faster compression, but are not yet optimized in this regard. In the present case, an improved zero-run-length encoder hardware system is desired for JPEG and other applications.

SUMMARY OF THE INVENTION

In accordance with the present invention, a zero-run-length (ZRL) encoder comprises an addressable memory, zero-detection logic, a shift register, a value generator, an accumulator, an entropy encoder, done-detection logic, and last-address-dection logic. The memory receives and stores a series of input values, for example, the sixty-three AC coefficients of a DCT operation in a JPEG compression scheme. The memory includes an address input and a read output. When an address value is received at the address input, the input value stored at a memory location corresponding to the address value is made available for reading at the read output.

The zero-detection logic determines, for each input value, whether it is zero or nonzero. For each zero input value, a zero indication, e.g., "0", is stored in a bit position of the shift register corresponding to the memory location of the input value; for each nonzero input value, a nonzero indication, e.g., "1", is stored in a bit position of the shift register corresonding to the memory location of the nonzero input value.

The bit positions are allocated between a leading section and a trailing section of the shift register. In the case of a JPEG system, the sixty-three shift register positions are divded between a 15-bit leading section and a 48-bit trailing section. The zero/nonzero indications for the lower frequency DCT terms are stored in the leading section, while the higher frequency terms are initially stored in the trailing section.

The shift register includes a shift input. When a shift occurs, the shift of zero/nonzero indications is in the direction from the trailing section toward the leading section so that some of the lower frequency terms are discarded. The magnitude of the shift is determined by a shift value received at the shift input. Trailing bit positions vacated by the shift are preferably filled with zero indications.

The value generator generates an offset value, a code value, and a shift value. In the preferred embodiment, the value generator includes a leading-zero counter and an incrementer. The leading zero counter determines the number of leading zeroes in the leading section of the shift register; this count serves as the code value. The incrementer adds one to the leading zero count to obtain both the offset value and the shift value. However, there are several mathematically equivalent approaches to achieving the same functionality.

The accumulator adds the offset value to a previous address value to obtain a present address value. In the preferred embodiment, the accumulator includes an adder and an accumulator register. The accumulator register stores the previous address value (which is preset to zero at the beginning of an input cycle). The adder adds the offset value to the previous address value to obtain the present address; the present address value replaces the previous address value in the accumualtor register.

The present address value is also provided to the address input of the memory; in response, the input value stored at the memory location corresponding to the present address value is made available to the entropy encoder. In addition, the value generator makes the code value available to the entropy encoder. The entropy encoder outputs an entropy code as a function of the addressed input value and the code value.

Once the code value is generated, the contents of the shift register are shifted by the amount of the shift value received from the value generator. This shift has the effect of discarding zero/nonzero indications that have already been represented in output codes so that a new code cycle can begin. The new code cycle involves a new leading zero count so that new code, offset, and shift values are determined. The new offset value is used to generate a new address. The resulting input value and the new code value are used to generate the next output code.

The done-detection logic determines when coding for an input cycle is complete. In the preferred embodiment, this determination is made by examining the contents of the shift register. If the shift register includes only zeroes, then the done indication is issued. The done indication can be provided to the entropy encoder to cause an end-of-block (EOB) code to be generated. In the preferred embodiment, if all input values in the memory are zeroes, the EOB code is the first and only code generated by the entropy encoder for that input cycle.

Because, it would be redundant, the EOB code need not be issued when the last input value read by the entropy encoder was stored in the last memory location. This can occur where the last input value was not zero, or where the last input value happened to immediately follow a maximal string of leading zeroes. The last-address-detection logic is coupled to the accumulator for determining when the present address is the last address. If the present address is the last address, a corresponding indication is sent to the entropy encoder, which responds by inhibiting the EOB code. Whether or not the EOB code is issued, the done detection is used to reset the accumulator and otherwise ready the zero-run-length encoder for the next input cycle.

A method of the present invention begins with receiving and storing input values in a memory; if not already initialized, the accumulator is reset. For each memory location, the zero or nonzero status of the input value stored therein is indicated at a respective bit position of a shift register. The shift register can be checked to determine if it contains only zero indications. If it contains only zero indications, the input cycle is ended and the method returns to the step of receiving input values. Preferably, an EOB code is generated under the conditions desribed above before the next input cycle is begun.

If there is at least one nonzero indication in the shift register, the number of leading zero indications in the leading section of the shift register is used to determine an offset value, a code value, and a shift value. In the preferred embodiment, the code value equals the leading zero count, while the offset value and the shift value exceed this count by one.

The offset value is added to the previous address value stored in the accumulator to obtain a present address value. For the first code cycle, the previous address value is preferably zero. For the second code cycle, the previous address value is the present address value of the previous code cycle. The present address value replaces the previous address value in an accumulator register.

The present address value is provided to an address input of the memory so that the input value at the addressed memory location can be read by the entropy encoder. The entropy encoder also reads the code value from the value generator. The addressed input value and the code value are used to determine an entropy code.

The value generator also provides the shift value to the shift register so that the zero/nonzero indications for the just coded input values are discarded. The remaining indications are shifted in the direction from the trailing section toward the leading section of the shift register. The vacated bit positions of the trailing section are filled with zero indications. The method then returns to the done detection step. After no more than sixty-three code cycles in the JPEG case, the shift register will be filled with zero indications, at which time, the input cycle is ended.

Just as the zero-run-length encoder compresses data, the present invention compresses the time required to compress the data by skipping over zeroes rather than processing each input value in series. This advantage is achieved simply and economically. These and other features and advantages of the present invention are apparent from the description below with reference to the following drawings.

DESCRIPTION OF THE PREFERRED EMBODIMENTS

Figure 1:
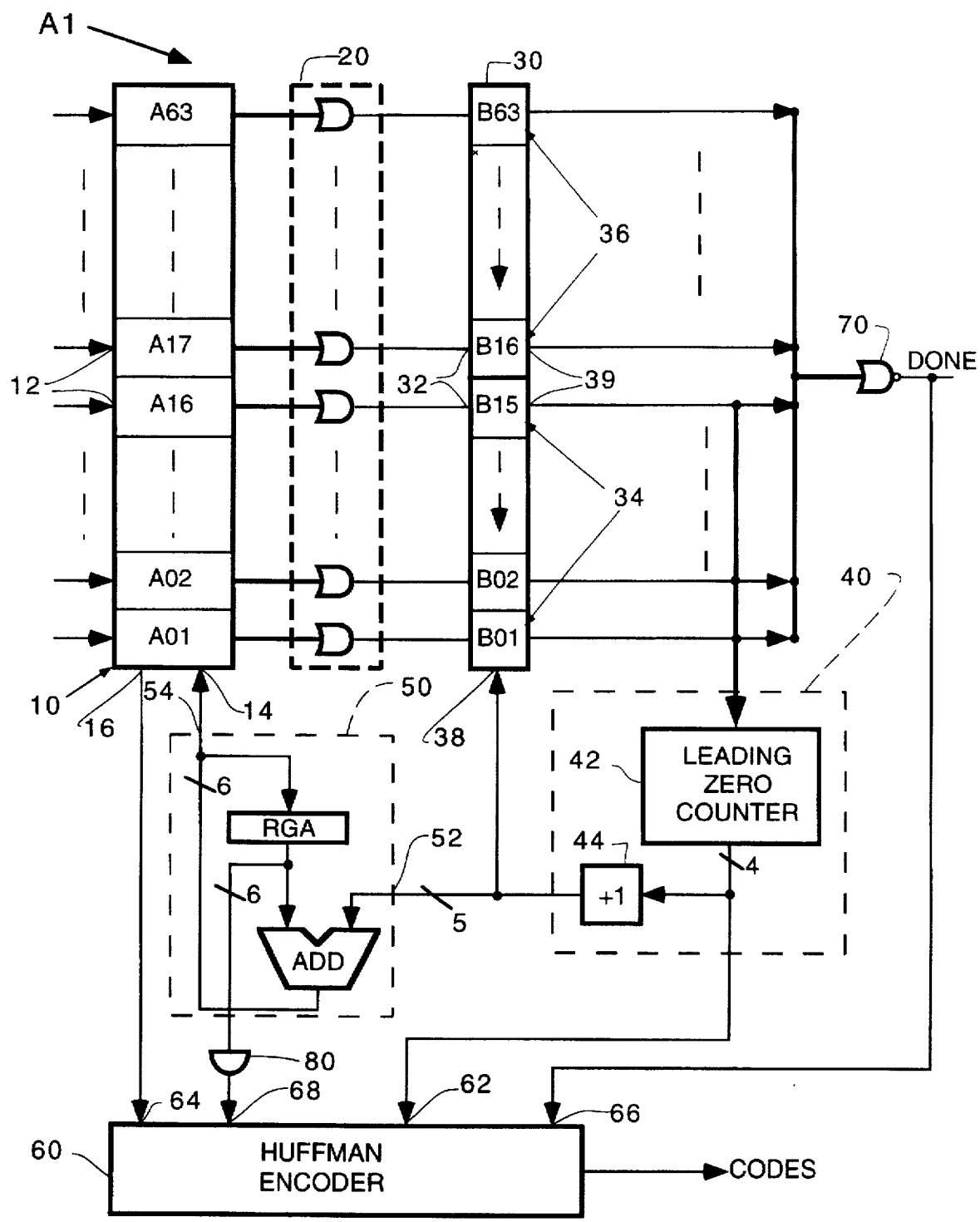
FIG. 1 is a schematic diagram of a zero-run-length encoder in accordance with the present invention.

In accordance with the present invention, a zero-run-length encoder A1 comprises addressable memory 10, zero-detection logic 20, a shift register 30, a value generator 40, an address accumulator 50, a Huffman encoder 60, done-detection logic 70, and last-value-detection logic 80, as shown in FIG. 1. Zero-run-length encoder A1 is designed to be incorporated into a JPEG encoding system, which includes provisions for merging the output of Huffman encoder 60 appropriately into the JPEG encoding format. Those skilled in the art can determine the unillustrated timing elements required for zero-run-length encoder A1 to perform the functions described below.

Memory 10 has sixty-three memory locations A01–A63 for respectively storing sixty-three quantized AC DCT coefficients. These input values are input to bank 10 via data inputs 12. Each memory location has a capacity of twelve bits, equal to the maximum precision to be handled by ZRL encoder A1. In 8-bit precision mode, the four most significant bits of each register are filled with zeroes. In addition to data inputs 12, memory 10 has an address input 14 for receiving an address value that selects a memory location and a read output 16 for outputting the contents of the selected memory location.

Zero-detection logic 20 is a bank of sixty-three OR gates. Each OR gate has twelve inputs coupled to respective bits of a respective one of memory locations A01–A63. When the value stored in the respective memory location is nonzero, the output of the respective OR gate is "1"; if the valued stored is zero, the output is "0".

Shift register 30 has sixty-three bit positions B01–B63 with respective inputs 32 coupled to respective outputs of the OR-gates of zero-detection logic 20. The bit positions are divided into a leading section 34 with fifteen bit positions (B01–B15) and a trailing section 36 with the remaining forty-eight bit positions (B16–B63). In addition, shift register 30 has a shift value input 38 for receiving a shift value. The shift value controls the number of bit positions the zero/nonzero indications shift in the direction from the trailing section to the leading section. Trailing section bit positions vacated during a shift are filled with zeroes. In addition, shift register 30 has sixty-three read outputs 39.

Value generator 40 includes a leading zero counter 42 and an incrementer 44. Leading zero counter 42 has fifteen parallel inputs coupled to respective read outputs of shift register leading section 34. The 4-bit output of the leading zero count serves as a code value to be input to Huffman encoder 60. Incrementer 44 increments the code value by one to yield a 5-bit offset value and a 5-bit shift value. For example, if bit position B01 stores a "1" so that there are no leading zeroes, the code value is "0000" (=0), while the shift and offset values are "00001" (=1). For another example, if bit positions B01 and B02 store zeroes and bit position B03 stores a 1, the code value is 0010 (=2), and the shift and offset values are 00011 (=3). Finally, if all fifteen bit positions of leading section 42 are filled with zeroes, the code value is 1111 (=15) and the shift and offset values are "10000" (=16) at its output.

Accumulator 50 basically comprises an adder ADD and a accumulator register RGA. The input 52 of accumulator 50 is coupled to value generator 40 and serves as one input to adder ADD. The other input to adder ADD is coupled to an output of register RGA. The output of adder ADD is coupled to the input of register RGA. Thus, the offset value provided by value generator 40 is added to the previous address value stored in register RGA to yield a present address value. The present address value replaces the previous address value in register RGA. The previous address value for the first code is intialized to zero. The output of adder ADD also serves as the output 54 of accumulator 50 which is coupled to address input 14 of memory 10.

Huffman encoder 60 has an input 62 coupled to the output of the leading zero counter 42 for receiving the leading zero count therefrom and an input 64 coupled to read output 16 of memory 10 for receiving the addressed input value therefrom. In addition, Huffman encoder has an input 66 coupled to done-detection logic 70, and an input 68 coupled to last-value-detection logic 80. Huffman encoder 60 outputs codes from its output as an entropy function of selected input value and the code value. The code generated by Huffman encoder conforms to the description in JPEG *Still Image Data Compression Standard* by William B. Pennebaker and Joan L. Mitchell, Van Nostrand Reinhold, New York, 1993, especially Chapter 11.

Done-detection logic 70 is a 63-input NOR-gate with inputs tied to respective bit positions of shift register 30 so that it determines whether or not shift register 30 is completely filled with zeroes or not. If there is at least one nonzero value in shift register 30, a next code cycle is begun. An input cycle can have one to sixty-three code cycles.

The next shift cycle begins with shift register 30 responding to the shift value received at its shift value input 38 by shifting from trailing section 36 toward leading section 34. Trailing bit positions vacated by the shift are filled with zeroes. This shift effectively discards the leading zeroes counted by address offset generator 40 as well as the value stored at the immediately succeeding bit position. The remainder of this and any subsequent shift cycles proceeds as with the first shift cycle, beginning with generation of the leading zero count.

When shift register 30 contains only zeroes, done-detection logic 70 issues a done signal that resets, if necessary, accumulator 50 and permits a next set of input values to be stored in memory 10. In addition, the done signal is issued to Huffman encoder 60, which issues an "end of block" (EOB) code in response, unless a last-input-value detection signal is provided by last-value-detection logic 80. If all input values in memory 10 are zero, the EOB code is issued immediately, and the next input cycle can begin.

Last-value-detection logic 80 is basically a six-input AND gate that detects when the address value stored in register RGA is 111111 (=63). When shift register 30 contains only zero indications and the present address value is sixty-three, no EOB is encoded. However, accumulator 50 is reset and the next set of input values can be accepted. When shift register 30 contains only zero indications and the present address value is other than sixty-three, an EOB is encoded.

Figure 2:
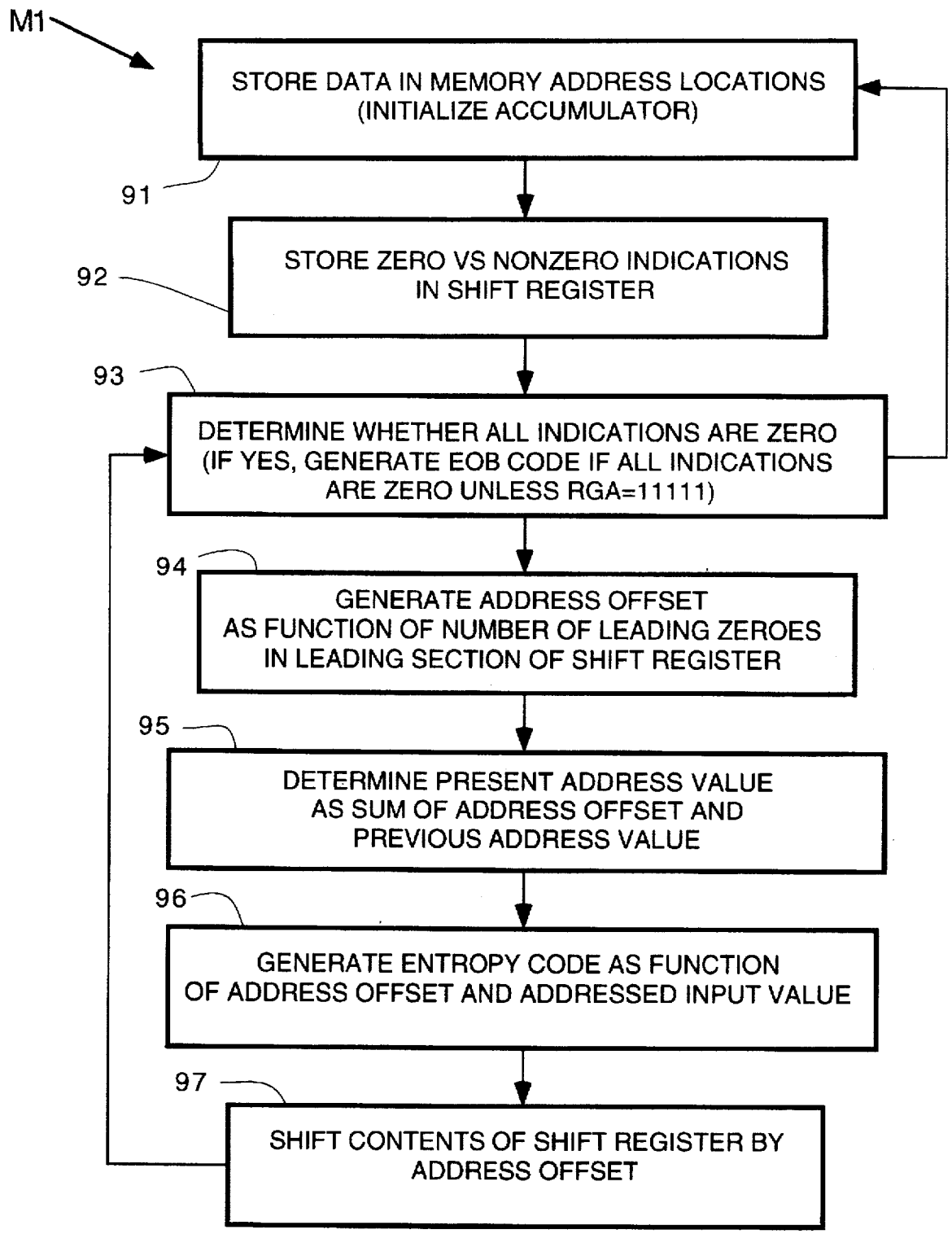
FIG. 2 is a flow chart of a zero-run-length encoding method of the invention.

The method M1 of the present invention is described in greater detail below, with reference to the flow chart of FIG. 2. At step 91, sixty-three input values, e.g., AC DCT coefficients, are loaded into memory 10 and accumulator register RGA is forced to zero. At step 92, zero=0/nonzero=1 indications for each memory location A01–A63 are stored in respective bit positions B01–B63 of shift register 30.

At step 93, a determination is made whether or not there are any nonzero indications in shift register 30. If there are none, a done indication is generated (by done-detection logic 70) and method M1 returns to step 91 to accept a next set of input values. An EOB code is inserted in the encoded output unless the address value in register RGA is 111111. (Thus, no EOB code is inserted if the sixty-third input value in memory 10 is nonzero or if it was encoded along with 15 preceding zero values.) If there is at least one nonzero indication in shift register 30, method M1 proceeds to step 94.

At step 94, an offset value is determined by value generator 40 by adding one to the number of leading zeroes in leading section 34 of shift register 30. For example, if no bit positions have zero, the five-bit output of address offset generator 40 is "00001"; if all fifteen bit positions have zeroes, the five-bit output of address offset generator 40 is "10000".

At step 95, the offset value is added to the previous address value stored in register RGA. The resulting "present address value" replaces the previous address value in register RGA and is used to address memory 10. Note that if all bit positions in leading section 34 store zero indications, the input value at the addressed memory location may or may not be zero. If leading section 34 of shift register 30 contains at least one nonzero indication, the value at the addressed memory location is non-zero. At step 96, Huffman encoder 70 generates an output code as a function of the input value stored at the addressed memory location and the leading zero count.

At step 97, shift register 30 shifts its contents in the direction from trailing section 36 toward leading section 34 so that at least some of the values stored in the trailing bit section 36 are moved to leading bit section 34. This shift has the effect of discarding indications corresponding to the zero and nonzero values represented in the code generated in the previous step. This completes a shift cycle of method M1, which then returns to step 93 for the next shift cycle.

Alternative embodiments differ in the way memory addressing and shifting respond to the leading zero count. In addition, done detection can be executed by monitoring the accumulator value instead of the contents of the shift register. This permits more direct generation of the EOB code. While a Huffman encoder is used in the preferred embodiments, arithmetic or other entropy encoders can be used as well. These and other variations upon and modification to the preferred embodiments are provided for by the present invention, the scope of which is limited only by the following claims.

I claim:

1. A zero-run-length encoder comprising:

memory having addressable memory locations for collectively storing a respective series of input values, said memory having an address input for receiving a present address value corresponding to one of said memory locations, said memory having a memory output from which it provides the input value stored at said memory location;

a shift register having bit positions corresponding to respective ones of said memory locations, said shift register having a leading section of bit positions and a trailing section of bit positions, said shift register having a shift value input for receiving a shift value, said shift register shifting indications stored in said bit positions so that at least some indications stored in said trailing section are moved to said leading section;

zero-detection logic for storing zero-versus-nonzero indications in said shift register, said zero-detection logic storing at each bit position an indication whether or not the input value stored at the respective memory location is zero or nonzero, said zero indictor logic being coupled to said memory for determining said indications, said zero indicator logic being coupled to said shift register for storing said indications therein;

a value generator for generating a code value, a shift value, and an offset value as a function of the number of leading zeroes in said leading section of said shift register, said value generator being coupled to said shift register;

an accumulator for adding said offset value to a previous address value to obtain said present address value, said accumulator being coupled to said address input of said memory for providing said present address value thereto; and an entropy encoder for providing an output code as a function of the input value provided at said memory output and said code value, said entropy encoder being coupled to said memory output and said value generator.

2. A zero-run-length encoding method comprising:

a) storing a series of input values in a memory with addressable memory locations;

b) storing indications whether or not the input value stored in each of said memory locations is zero in respective bit positions of a shift register having leading and trailing sections;

c) generating a code value, a shift value, and an offset value as a function of the number of leading zeroes in said leading section of said shift register;

d) adding said offset value to a previous address value to yield a present address value;

e) generating an entropy code as a function of said code value and of the input value stored at the memory location addressed by said present address value; and f) shift the indications stored in said shift register as a function of said shift value in the direction from said trailing section to said leading section, and returning to step c.

3. A method as recited in claim 2 further characterized in that in step f, bit positions of said shift register vacated by a shift are filled with zero indications.

4. A method as recited in claim 2 further comprising a step of determining when said shift register contains only zero indications and, in that event, returning to step a.

* * * * *